US012682055B2

(12) United States Patent
Medwed et al.

(10) Patent No.: US 12,682,055 B2
(45) Date of Patent: Jul. 14, 2026

(54) SCALABLE CODE SIGNATURE APPROACH FOR CONTROL-FLOW INTEGRITY

(71) Applicant: NXP B.V., Eindhoven (NL)

(72) Inventors: Marcel Medwed, Stattegg (AT); Jan Hoogerbrugge, Helmond (NL); Georg Martin Pacher, Graz (AT); Philip Ortlieb, Graz (AT); Mario Lamberger, Graz (AT)

(73) Assignee: NXP B.V., Eindhoven (NL)

( * ) Notice: Subject to any disclaimer, the term of this patent is extended or adjusted under 35 U.S.C. 154(b) by 93 days.

(21) Appl. No.: 18/922,772

(22) Filed: Oct. 22, 2024

(65) Prior Publication Data

US 2026/0111545 A1  Apr. 23, 2026

(51) Int. Cl.
*G06F 21/55*  (2013.01)
*G06F 21/54*  (2013.01)

(52) U.S. Cl.
CPC ............ *G06F 21/556* (2013.01); *G06F 21/54* (2013.01)

(58) Field of Classification Search
CPC .............................. G06F 21/556; G06F 21/54
USPC .......................................................... 726/22
See application file for complete search history.

(56) References Cited

U.S. PATENT DOCUMENTS

| | | | | |
|---|---|---|---|---|
| 5,671,237 A | * | 9/1997 | Zook ................... | G06F 11/1004 714/E11.038 |
| 5,724,368 A | * | 3/1998 | Zook ................... | H03M 13/091 714/763 |
| 5,974,529 A | | 10/1999 | Zumkehr et al. | |
| 6,836,869 B1 | * | 12/2004 | Wyland ............... | H03M 13/158 714/784 |
| 6,848,072 B1 | * | 1/2005 | Milliken ............... | H04L 1/0061 714/781 |
| 6,912,683 B2 | * | 6/2005 | Rifaat ................. | H03M 13/091 714/757 |
| 7,543,214 B2 | * | 6/2009 | Ricci ................... | H03M 13/091 714/776 |
| 7,571,370 B2 | * | 8/2009 | Ridgeway ........... | H03M 13/091 382/296 |
| 8,464,125 B2 | * | 6/2013 | Gopal ................. | G06F 11/1004 714/758 |

(Continued)

OTHER PUBLICATIONS

Mario Werner et al., "Protecting the Control Flow of Embedded Processors against Fault Attacks,"—https://link.springer.com/chapter/ 10.1007/978-3-319-31271-2_10.

*Primary Examiner* — Samson B Lemma

(57) ABSTRACT

A processor and methods of detecting a corrupted instruction stream within a processor include executing, by the processor, a program including a plurality of basic blocks, each of which includes a sequence of instructions to be executed by the processor without branching. The method includes implicitly initializing a first cyclic-redundancy-check (CRC) generator based on a first portion of an address of a first instruction in a first basic block and a second CRC generator based on a second portion of the address of the first instruction, generating, by the first CRC generator, a first CRC output according to a first polynomial and, by the second CRC generator, a second CRC output according to a second polynomial, and when an end of the first basic block is reached without encountering an instruction to transfer control from a first function to a second function, selectively deferring a CRC check operation.

19 Claims, 5 Drawing Sheets

(56)         References Cited

U.S. PATENT DOCUMENTS

| | | | | |
|---|---|---|---|---|
| 8,732,548 | B2 * | 5/2014 | Gopal | H03M 13/091 |
| | | | | 714/758 |
| 9,047,082 | B2 * | 6/2015 | Gopal | G06F 11/1004 |
| 10,228,945 | B2 | 3/2019 | Wenzel | |
| 10,248,498 | B2 * | 4/2019 | Sun | G06F 11/1004 |
| 10,515,206 | B2 | 12/2019 | Gammel | |
| 2003/0061561 | A1 * | 3/2003 | Rifaat | H03M 13/6569 |
| | | | | 714/774 |
| 2004/0049726 | A1 * | 3/2004 | Goyins | G06F 11/1008 |
| | | | | 714/E11.035 |
| 2007/0016842 | A1 * | 1/2007 | Samuel | H03M 13/09 |
| | | | | 714/781 |
| 2011/0041013 | A1 | 2/2011 | Ingimundarson | |
| 2011/0145683 | A1 * | 6/2011 | Gopal | G06F 9/30145 |
| | | | | 714/781 |
| 2012/0066551 | A1 | 3/2012 | Palus et al. | |
| 2013/0191699 | A1 * | 7/2013 | Gopal | H03M 13/09 |
| | | | | 714/758 |
| 2014/0229807 | A1 * | 8/2014 | Gopal | H03M 13/09 |
| | | | | 714/807 |
| 2017/0250710 | A1 * | 8/2017 | Asanaka | H03M 13/617 |
| 2018/0143872 | A1 * | 5/2018 | Sun | H03M 13/6502 |

* cited by examiner

```
Test:   li          a0, 0
        li          a1, 3
        li          a3, 5
        c.cscheck
L2:     addi        a0, a0, 1
        mul         a3, a3, a3
        c.csref     0
        csbne       a0, a1, 0, L2
        sub         a0, a2, a3
        csref       0
        ret
```

```
li          a0, 0
li          a1, 3
li          a3, 5
c.cscheck                       102
```

```
addi        a0, a0, 1
mul         a3, a3, a3
c.csref     0
csbne       a0, a1, 0, L2       104
```

```
sub         a0, a2, a3
csref       0
ret                             106
```

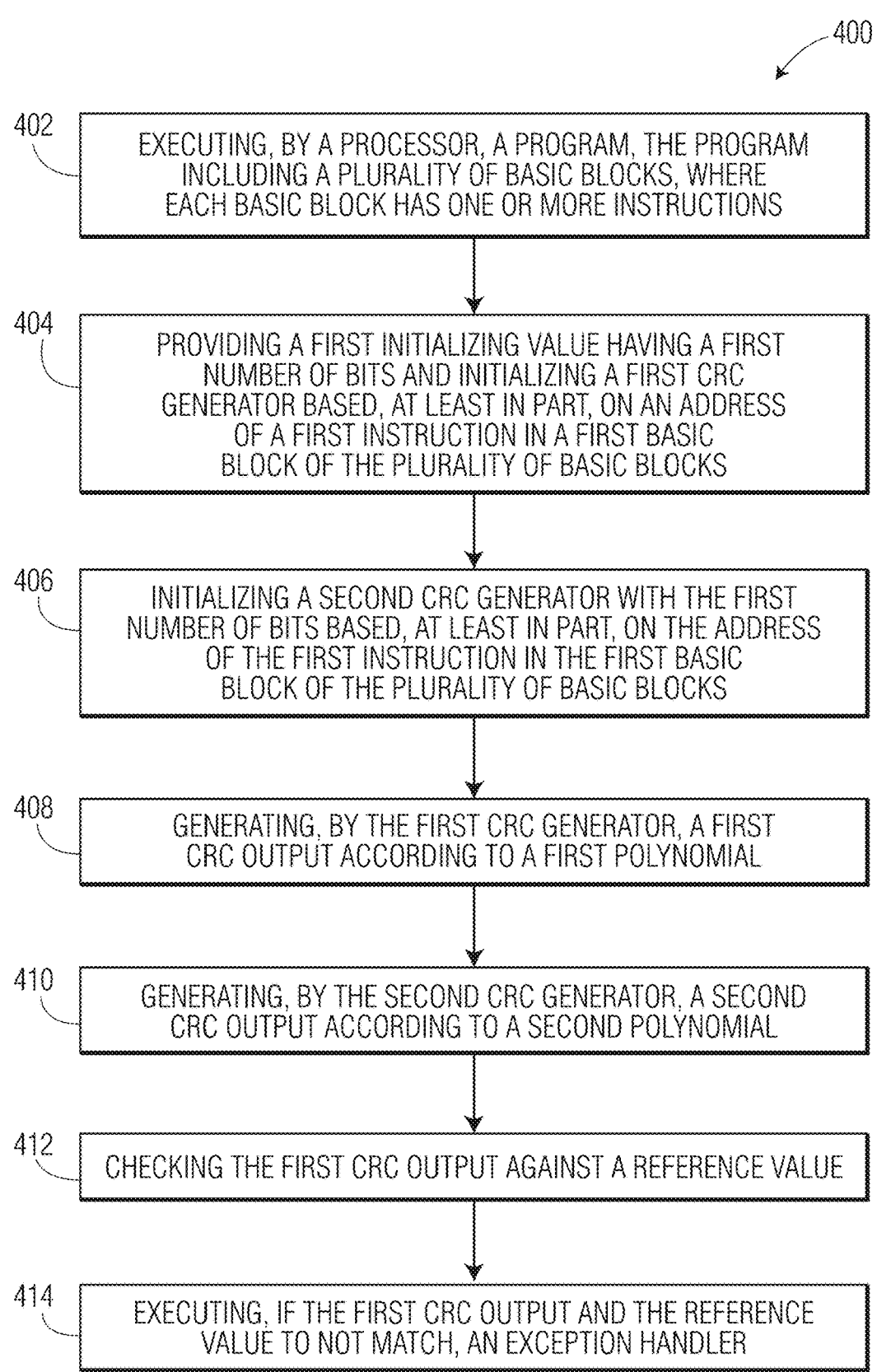

400

402 — EXECUTING, BY A PROCESSOR, A PROGRAM, THE PROGRAM INCLUDING A PLURALITY OF BASIC BLOCKS, WHERE EACH BASIC BLOCK HAS ONE OR MORE INSTRUCTIONS

404 — PROVIDING A FIRST INITIALIZING VALUE HAVING A FIRST NUMBER OF BITS AND INITIALIZING A FIRST CRC GENERATOR BASED, AT LEAST IN PART, ON AN ADDRESS OF A FIRST INSTRUCTION IN A FIRST BASIC BLOCK OF THE PLURALITY OF BASIC BLOCKS

406 — INITIALIZING A SECOND CRC GENERATOR WITH THE FIRST NUMBER OF BITS BASED, AT LEAST IN PART, ON THE ADDRESS OF THE FIRST INSTRUCTION IN THE FIRST BASIC BLOCK OF THE PLURALITY OF BASIC BLOCKS

408 — GENERATING, BY THE FIRST CRC GENERATOR, A FIRST CRC OUTPUT ACCORDING TO A FIRST POLYNOMIAL

410 — GENERATING, BY THE SECOND CRC GENERATOR, A SECOND CRC OUTPUT ACCORDING TO A SECOND POLYNOMIAL

412 — CHECKING THE FIRST CRC OUTPUT AGAINST A REFERENCE VALUE

414 — EXECUTING, IF THE FIRST CRC OUTPUT AND THE REFERENCE VALUE TO NOT MATCH, AN EXCEPTION HANDLER

FIG. 4

SCALABLE CODE SIGNATURE APPROACH FOR CONTROL-FLOW INTEGRITY

FIELD OF THE DISCLOSURE

Illustrative embodiments disclosed herein relate to methods and apparatus for implementing various forward-edge control-flow integrity mechanisms.

BACKGROUND

Advances in semiconductor manufacturing technology and digital systems architecture have resulted in the widespread adoption of various digital products and computational resources into industrial, business, and personal uses. Because these products and resources have become integral to modern life, they are relied upon to handle or control all sorts of valuable information, communications, and actions. Unfortunately, the great value and utility of the aforementioned information, communications, and actions makes the underlying digital products and computational resources the subject of attack by bad actors.

The attack surface of the digital products and computational resources mentioned above, together with the networks over which they communicate, is large. Many attacks are directed at computers and computer-based devices through the networks over which they communicate. Still other attacks may be classified as fault attacks.

Fault attacks on computer systems deliberately introduce errors into a system's hardware or software in order to cause one or more malfunctions that may lead the attacker to gain control of the system or to extract information from the system. In other words, by introducing errors through fault attacks, the attacker seeks to bypass security measures or alter the behavior of a system in a way that may compromise its security or integrity.

SUMMARY

A summary of various illustrative embodiments is presented below.

Various illustrative embodiments relate to forward-edge control-flow integrity. In one illustrative embodiment, a method of detecting a corrupted instruction stream includes executing, by a processor, a program, the program including a plurality of basic blocks, wherein each basic block has one or more instructions to be executed by the processor without branching, retrieving, by an instruction fetch unit of the processor, a first basic block of the program from a memory address associated with a memory device, initializing a first cyclic-redundancy-check (CRC) generator within the processor based, at least in part, on a first portion of the memory address of a first instruction in the first basic block of the plurality of basic blocks, initializing a second CRC generator within the processor based, at least in part, on a second portion of the memory address of the first instruction, generating, by the first CRC generator, a first CRC output based on the first basic block according to a first polynomial, generating, by the second CRC generator, a second CRC output based on the first basic block according to a second polynomial, executing the first basic block, and when an end of the first basic block is reached without encountering an instruction to transfer control from a first function of the first basic block to a second function, selectively deferring a CRC check operation, and generating, by the first CRC generator, a third CRC output based on a next basic block of the program according to the first polynomial without reinitializing the first CRC generator, and generating, by the second CRC generator, a fourth CRC output based on the next basic according to the second polynomial without reinitializing the second CRC generator.

In one or more embodiments, the first polynomial and the second polynomial are co-prime.

In one or more embodiments, a first order of the first polynomial and a second order of the second polynomial are selected to provide a selected security level.

In one or more embodiments, the selected security level is sixteen bits, the first order of the first polynomial is eleven, and the second order of the second polynomial is five.

In one or more embodiments, the first CRC generator is a CRC-11 generator, and the second CRC generator is a CRC-5 generator.

In one or more embodiments, the method further includes determining a second basic block includes a branch function to the next basic block, performing the CRC check operation based on the second basic block, and optionally performing a CRC correction operation when the CRC check operation determines a bit error.

In one or more embodiments, when a number n of basic blocks branch to a common basic block, the method includes performing the CRC check operation for one less than the number $(n-1)$ of the basic blocks that branch to the common basic block, and optionally performing a CRC correction operation for bits of one of the number n of the basic blocks when the CRC check operation for the one determines a bit error.

In one or more embodiments, selectively deferring the CRC check operation includes concatenating reference bits from instructions of the first basic block to form a reference value, determining a number of the reference bits, and deferring the CRC check operation when the number of reference bits is less than a number of bits of either the first CRC generator or the second CRC generator.

In one or more embodiments, the method further includes concatenating reference bits from instructions of the first basic block to form a reference value, determining a number of the reference bits, and selectively performing a partial correction based on one of the first CRC value or the second CRC value to produce corrected bits when the number of reference bits is equal to or greater than a number of bits of the second CRC generator and less than a number of bits of the first CRC generator.

In one or more embodiments, subsequently, when the CRC check operation is performed, the method further includes performing the CRC check operation on the corrected bits, and ignoring a state of the uncorrected bits.

In one or more embodiments, the method further includes concatenating reference bits from instructions of the first basic block to form a reference value, determining a number of the reference bits, performing the CRC check operation based on both the first CRC value and the second CRC value when the number of the reference bits is equal to a sum of a first number of bits of the first CRC generator and a second number of bits of the second CRC generator, and reinitializing the first CRC generator and the second CRC generator using a first memory address of a first instruction of the next basic block.

In one or more embodiments, implicitly initializing the first CRC generator occurs at a beginning of execution of the first basic block.

In another illustrative embodiment, a method of using code signatures to verify flow control integrity includes executing, by a processor, a program, the program including a plurality of basic blocks, wherein each basic block has one or more instructions to be executed by the processor without branching, retrieving, by an instruction fetch unit of the processor, a first basic block of the program from a memory address associated with a memory device, implicitly initializing a first cyclic-redundancy-check (CRC) generator and a second CRC generator within the processor based on one or more portions of the memory address of a first instruction in the first basic block of the plurality of basic blocks, generating, by the first CRC generator, a first CRC output according to a first polynomial and, by the second CRC generator, a second CRC output according to a second polynomial based on the first basic block, executing the first basic block, concatenating reference bits determined from instructions of the first basic block to determine reference bits, and when an end of the first basic block is reached without encountering an instruction to transfer control from a first function of the first basic block to a second function, determining a number of reference bits, and selectively deferring a CRC check operation based on the number of reference bits.

In one or more embodiments, selectively deferring the CRC check operation comprises deferring the CRC check operation when the number of reference bits is less than a number of bits of either the first CRC generator or the second CRC generator.

In one or more embodiments, the method further includes selectively performing a partial correction based on one of the first CRC value or the second CRC value to produce corrected bits when the number of reference bits is equal to or greater than a number of bits of the second CRC generator and less than a number of bits of the first CRC generator.

In one or more embodiments, subsequently, when the CRC check operation is performed, the method further includes performing the CRC check operation on the corrected bits, and ignoring a state of the uncorrected bits.

In one or more embodiments, the method further includes performing the CRC check operation based on both the first CRC value and the second CRC value when the number of the reference bits is equal to a sum of a first number of bits of the first CRC generator and a second number of bits of the second CRC generator, and reinitializing the first CRC generator and the second CRC generator using a memory address of a first instruction of the next basic block.

In one or more embodiments, a first order of the first polynomial and a second order of the second polynomial are selected to provide a selected security level, the selected security level is sixteen bits, the first CRC generator generates an eleven-bit checksum, and the second CRC generator generates a five-bit checksum.

In a further illustrative embodiment, a processor includes a program counter, an instruction fetch unit configured to provide instructions that comprise a program including a plurality of basic blocks, each basic block including a sequence of instructions to be executed without branching, an instruction decode unit coupled to the instruction fetch unit, the instruction decode unit configured to receive a first basic block of the plurality of basic blocks, and to generate a plurality of control signals, a first cyclic-redundancy-check (CRC) generator coupled to the program counter to receive an address, coupled to the instruction fetch unit to receive the bits of the instructions, and coupled to the instruction decode unit to receive at least a portion of the plurality of control signals, the first CRC generator configured to generate a first CRC output in accordance with a first polynomial based on the instructions of the first basic block, a register to store the first CRC output and the second CRC output and to concatenate and store reference bits determined from each of the instructions to form a reference value, and CRC control circuitry configured to determine a number of reference bits of and to selectively defer a CRC checking operation based, at least in part, on the number of reference bits.

In one or more embodiments, the CRC control circuitry selectively defers the CRC check operation when, at the end of execution of the first basic block, the instructions do not branch to another function and when the number of reference bits is less than a number of bits of either the first CRC generator or the second CRC generator.

BRIEF DESCRIPTION OF DRAWINGS

To facilitate a better understanding of various illustrative embodiments, reference is made to the accompanying drawings.

FIG. 4 is a flow diagram of a method in accordance with this disclosure.

DETAILED DESCRIPTION

Figure 1A:
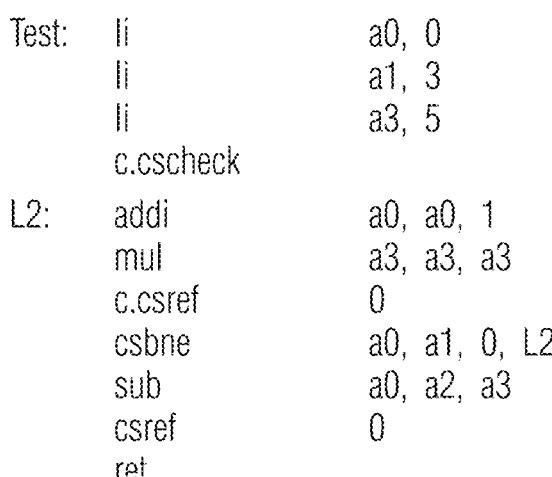
FIG. 1A is a listing of a sample program.

Fault attacks on computer systems may be initiated by means such as, but not limited to, power glitches, electromagnetic interference, temperature changes, and so on. Fault attacks pose threats to the reliability and security of computer systems generally. However, the threat from fault attacks may be even more significant for embedded systems, such as but not limited to, smart cards, and Internet-of-Things (IoT) devices. The threat posed to embedded systems may be more significant because their internal computational resources are typically constrained as compared to larger and more powerful computer systems and thus embedded systems may lack sufficient resources to effectively detect or prevent control transfers that may result from fault attacks. Further, the threat may be greater to embedded systems simply because smart cards and IoT devices, for example, are often exposed to fault attackers more easily in the environments in which they operate, as compared to other computer systems.

Many embedded systems include an embedded processor, i.e., a central processing unit (CPU) within the embedded system. The embedded processor executes software to help implement the functions of the embedded system. A fault attack may be part of an attempt at hijacking the control flow of a program during the execution of the program by the embedded processor.

To reduce the vulnerability of processors, including but not limited to embedded processors, to fault attacks, control-flow integrity mechanisms may be used. Although control-flow integrity mechanisms may be effective in terms of detecting and/or preventing control-flow hijacking, these mechanisms have some drawbacks in terms of increasing the code size of a program or limiting the scalability of the amount of security provided.

Control-flow integrity (CFI) is one approach to detect and mitigate the fault attacks that may result in an attacker affecting the control flow of a program, and consequently gaining unauthorized access to the computational resources and data of the device or system under attack. More particularly, CFI approaches or mechanisms are intended to detect and possibly prevent unauthorized alterations to the control flow of a program as it is executing. Generally, detecting and/or preventing control-flow hijacking involves generating a checksum of some type over each basic block in an instruction stream and comparing that checksum to a previously generated, i.e., pre-computed, checksum of the same basic block. As used herein, the term "basic block" refers to a "straight-line" code sequence with no in or out branches except at the beginning and end of the sequence. Generally, a basic block of instructions refers to a set of instructions that may be executed by a processor without any halt or branching. It is noted that some attacks might affect the instruction stream of a basic block without affecting its control-flow. For example, one such attach may include +a fault attack that results in the bit pattern of a Store instruction being corrupted such that the corrupted instruction is decoded as an Add instruction. By generating CRC values over the instruction stream of the basic blocks in the program's instruction stream, the integrity of the instruction stream, in addition to the integrity of a program's control flow, may also be protected by various embodiments in accordance with this disclosure.

Various aspects of this disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of, or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of this disclosure may be embodied by one or more elements of a claim.

Forward-edge control-flow integrity refers to security mechanisms designed to protect systems against control-flow hijacking attacks that aim to redirect an execution flow of a program to an unauthorized target address or to malicious code. Some forward-edge CFI mechanisms may deal with the enforcement of valid control-flow transfer during function calls, method invocations, or indirect jumps where the target is not known until runtime.

Forward-edge CFI mechanisms may be based, at least in part, on a control-flow graph of a program that is to be executed. A control-flow graph is a representation of possible execution paths through a program. A control-flow graph may be "pre-computed," i.e., available prior to execution of the program that it represents. The control-flow graph includes nodes, which represent blocks of code (referred to as basic blocks), and directed edges, which represent the possible flow of control between the basic blocks. By constraining the program execution to follow the control-flow graph, a forward-edge CFI mechanism may detect and block control-flow transfers that are not specified by the control-flow graph. That is, by determining that the instruction stream has been corrupted, it is possible to prevent invalid control-flow transfers.

Some forward-edge CFI mechanisms use a combination of software and hardware to detect a corrupted instruction stream. That is, a processor may include error detection hardware that operates to facilitate determining whether the instruction stream has been corrupted, and software executed by the processor may include special instructions that when executed cause the processor to further facilitate determining whether the instruction stream has been corrupted. These special instructions may be inserted into the basic blocks of a program by a compiler and/or another tool that further processes the output of the compiler. These special instructions are not intended to affect the logic of original program, but rather are intended to, at least in part, direct the operation of the error detection hardware. The basic blocks having special instructions inserted therein are referred to herein as being "instrumented."

In accordance with this disclosure, code signatures are a forward-edge CFI mechanism on the instruction level. That is, as part of enforcing that basic blocks only transfer control to valid target blocks, a code signature may be calculated over one or more portions of the instruction stream enabling the detection of a glitch in the instruction stream that is intended to be executed by, for example, a processor. As a result, a fault attack that, for example, changes the expected instruction stream may be detected.

A code signature is generated for each basic block using an error-detection code, such as for example a cyclic redundancy check, and these are described in greater detail below. Although code signatures are useful in detecting breaches of control-flow integrity, one drawback of code signatures is the code-size overhead they impose.

In general, there are two approaches regarding ways to maintain an internal state in a processor that is needed for code signature applications. Each of these approaches has different trade-offs that affect the scaling of security. As used herein, "scaling of security" refers to the tradeoff between code size and the level of security. One of the two approaches is based on correction or patching, which has code density advantages, but does not allow for a straight-forward scaling of security. The other approach is based on re-initialization of the internal state, which conversely has a straight-forward mechanism to scale security but requires a large amount of reference values to be injected via the code which decreases code density.

Some previous efforts to implement CFI mechanisms have involved one or more of, compiler technology, instruction set architecture, and processor hardware. For example, a compiler (or a compiler together with a post-processing tool) may generate instrumented code that, when executed, enables the operation of a forward-edge control-flow integrity mechanism. Such instrumented code may contain one or more custom instructions that have been added to an instruction set architecture. And, a processor may be provided with special hardware resources to enable the detection and/or prevention of control-flow hijacking when it is executing the instrumented code. Various aspects of custom instructions, instrumented code, and processor hardware are all discussed below.

One or more embodiments in accordance with this disclosure may implement a set of custom instructions by adding circuitry (e.g., control circuitry, registers, execution units, specialty functions, etc.) to a processor, such as a processor that implements the RISC-V ISA (see below for definition of, and details on, the RISC-V Instruction Set Architecture). Alternatively, embodiments in accordance with this disclosure may also be implemented in non-RISC-V processors.

One or more embodiments in accordance with this disclosure may include a processor having hardware resources to enable the detection and/or prevention of control-flow hijacking through the use of forward-edge control-flow integrity mechanisms. Some illustrative embodiments may include processors implemented to execute the RISC-V instruction set and a non-standard extension thereof. Alternative embodiments are not limited to the RISC-V instruction set architecture.

Regarding the RISC-V instruction set, in the field of computer design, particularly as it relates to processor design, an instruction set architecture (ISA) specification may have a number of different possible hardware implementations, and those implementations may be referred to as microarchitectures. Typically, processor designers are free to implement an ISA with the hardware and/or firmware of their choosing, as long as that implementation meets the ISA specifications. Generally, an ISA is visible to the programmer, but the microarchitecture is not.

It is noted that the name "RISC-V" represents the fifth major reduced instruction set computer (RISC) instruction set architecture (ISA) from the University of California at Berkeley. See, for example, "The RISC-V Instruction Set Manual, Volume I: User-Level ISA, Document Version 20191213," Editors Andrew Waterman and Krste Asanovic, RISC-V Foundation, December 2019; and "The RISC-V Instruction Set Manual, Volume II: Privileged Architecture, Document Version 20211203," Editors Andrew Waterman, Krste Asanovic, and John Hauser, RISC-V International, December 2021.

Some ISA specifications provide for a base set of instructions to be implemented, and further provide for one or more optional sets of instructions, referred to as "extensions" to be added to the implementation of the base instruction set by processor designers.

RISC-V is an example of an ISA specification that provides for processor designers to, for example, add instructions to the base ISA for implementation in the microarchitecture. Some instruction set extensions for RISC-V may be referred to as "standard" extensions, i.e., an instruction set extension that is pre-defined by the RISC-V ISA specification. The RISC-V ISA specifies a number of standard extensions, including, among others for example, extension "M" for integer multiplication and division, extension "F" for single-precision floating-point, and extension "D" for double-precision floating-point.

As noted above, RISC-V provides for the implementation of one or more custom instructions, i.e., instructions not defined by the base integer RISC-V ISA and the standard RISC-V ISA extensions. A set of such custom instructions may be referred to as a non-standard extension of the RISC-V ISA.

When adding custom instructions to an instruction set, for example adding a non-standard extension to the RISC-V ISA, it is useful to avoid encoding the custom instructions in a way that would conflict with the encoding of standard instructions in the ISA or extensions thereof. Instructions to be executed by a processor are encoded, that is represented by a string a ones and zeroes arranged in known fields, i.e., bit positions of an instruction word. Like other instruction set architectures, the RISC-V ISA specifies the fields of its base instructions and the fields of its standard extension instructions. With respect to custom instructions, the RISC-V ISA specifies the fields (i.e., bit positions) of an instruction word that are available for use by the encoded custom instructions.

Various aspects of implementing forward-edge control-flow integrity mechanisms in accordance with this disclosure are described below.

Embodiments in accordance with this disclosure provide apparatus and methods for forward-edge control-flow integrity mechanisms using code signatures that combine the advantages of correction or patching, with the advantages of re-initialization. To better explain this, first the ways in which the protection is provided for basic blocks are described.

Figure 1B:
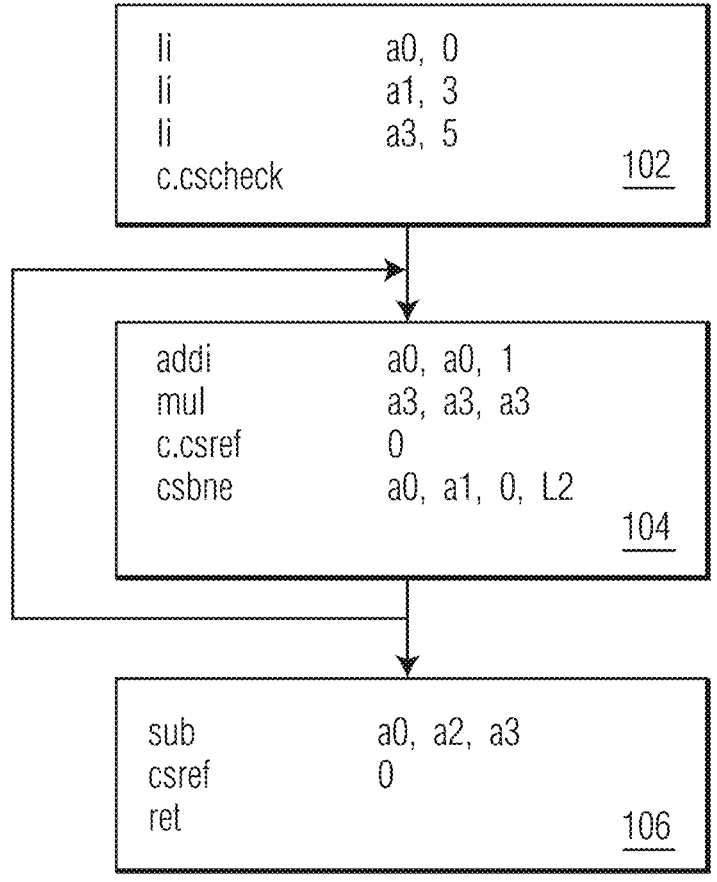
FIG. 1B illustrates the basic blocks for the sample program of FIG. 1A.

Referring to software, a program or parts of a program may be divided into basic blocks, which are a group of sequential instructions having an entry point at the first instruction, an exit at the last instruction, and no jumps or branches that target the middle of that group of instructions. FIG. 1A shows a listing of the instructions in a sample program 100, which is written in an assembly language format based on the RISC-V instruction set architecture. FIG. 1B shows how sample program 100 may be split into corresponding basic blocks 102, 104, 106.

As part of implementing a forward-edge control-flow integrity mechanism in accordance with this disclosure, a code signature is generated for each basic block using an error-detection code, such as for example a cyclic redundancy check (CRC). In one or more embodiments, a CRC generator may be configured to process a basic block to determine the code signature based, at least in part, on a remainder from a polynomial division of the contents of the basic block. In such an illustrative embodiment, the code signature may be referred to herein as a checksum.

As used herein, the term, checksum, refers to the output of a CRC generator. Although, CRC generators may be implemented in software, hardware, or combinations of software and hardware, some embodiments that are implemented within a processor may implement CRC generators as hardware, i.e., logic circuitry. It is further noted that logic circuitry for generating CRC output values may be configured to operate on serial data, or may be configured to operate on parallel data.

It is noted that using a serial approach to generating a checksum over (i.e., based on) the instructions of a basic block may take longer than the time required to execute the instructions. For example, if a 32-bit instruction takes one clock cycle to execute and it takes 32 cycles to serially generate a CRC output for the 32-bit instruction then program execution may have to stall waiting for the serial CRC generation to complete.

One or more embodiments in accordance with this disclosure may be implemented within a processor such as, but not limited to, an embedded processor. A simplified processor architecture suitable for discussing various aspects of this disclosure is described below in connection with FIG. 2.

Figure 2:
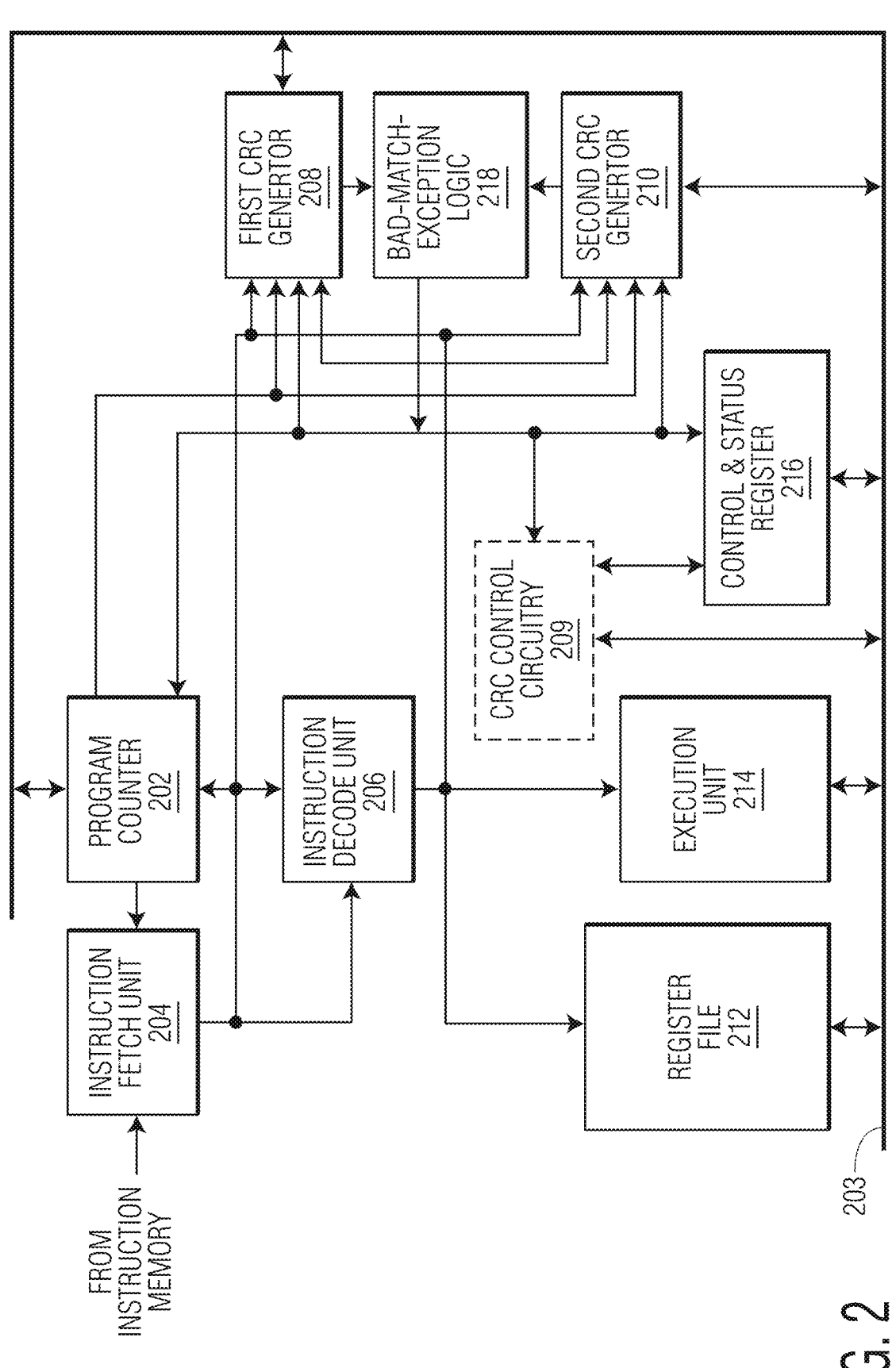
FIG. 2 is a high-level block diagram of an illustrative processor in accordance with this disclosure.

FIG. 2 is a high-level block diagram of a portion of a simplified processor. It will be appreciated that there are many other possible microarchitectural arrangements for a processor that implements forward-edge CFI mechanisms in accordance with this disclosure. By way of example and not limitation, data may be transferred between various blocks via bus transfers rather than through directly wired connections. The high-level block diagram of FIG. 2 is for purposes of illustrating various aspects of embodiments in accordance with this disclosure. The blocks shown in FIG. 2 represent logic circuitry for carrying out their indicated functions, for example an instruction fetch unit 204 to retrieve instructions from memory at an address specified by the contents of the program counter and provide those instructions to an instruction decoder.

It is noted that logic circuitry of various embodiments may be implemented with any suitable technology. Various embodiments may be implemented as integrated circuits. One common circuit technology for the design and implementation of integrated circuits for processors includes complementary metal oxide semiconductor (CMOS) technology. A CMOS process is a manufacturing process that can fabricate both p-channel field effect transistors (FETs) and n-channel FETs on the same chip. A CMOS circuit is a circuit that includes one or more of a p-channel FET or an n-channel FET.

Still referring to the simplified processor of FIG. 2, a program counter 202 is coupled to a bus 203, an instruction fetch unit 204, an instruction decode unit 206, a first CRC generator 208, and a second CRC generator 210. One or more embodiments may include generating, by one or more additional CRC generators, a corresponding one or more additional CRC outputs. These one or more additional CRC generators may operate in parallel with first CRC generator 208 and second CRC generator 210.

Instruction fetch unit 204 is also coupled to instruction decode unit 206. Instruction decode unit 206 is further coupled to first CRC generator 208, second CRC generator 210, a register file 212, and an execution unit 214. First CRC generator 208, second CRC generator 210, register file 212, execution unit 214, and a control-and-status register 216 are all coupled to bus 203. A bad-match-exception-logic block 218 is coupled to both first CRC generator 208, second CRC generator 210, program counter 202, and control-and-status register 216.

In one or more embodiments, the first CRC generator 208 and the second CRC generator 210 may be initialized using an implicit initialization method. Instead of explicitly providing static initialization values, the address of a first instruction of a selected basic block may be used as the initialization value. In one or more embodiments, the initialization may be performed without software intervention.

In one or more embodiments, the first CRC generator 208 may generate a first CRC value and the second CRC generator 210 may generate a second CRC value that may be provided to the bad-match-exception logic 218. The bad-match-exception logic 218 may be configured to compare the first and second CRC values to reference bits determined from instructions of the selected basic block, which may be concatenated to form a reference value that can be retrieved from the control and status registers 216 and compared to one or more of the first CRC value or the second CRC value to determine errors. The CRC values and the determined reference values may be used to correct only parts of the internal state of the processor, and subsequently to check only that substate or only parts of that substate against a reference value, which enables scaling security while maintaining a smaller code size while relying on a correction approach.

In one or more embodiments, the simplified processor of FIG. 2 may include or may be coupled to CRC control logic 209, which may be coupled to the bus 203 and optionally to the control and status registers 216. In one or more embodiments, the CRC control logic 209 may be integrated within the control and status registers 216. The CRC control logic 209 may be configured to enable a forward edge control-flow-integrity validation process, which can check and correct a full-width of the internal state of the processor when control is transferred or branches based on the instructions.

Within a function, the CRC control logic 209 may enable one or more short cuts, such as correcting less bits than a full state, enabling deferral of the CRC check operation with few checked bits or no check bits, or checking fewer bits than are maintained or corrected according to the security level. In the partial correction or deferred correction instances, the CRC control logic 209 may potentially accumulate several CRC checksum values or several small checks to increase security, and the CRC check/correction operation may be performed later.

The logic circuitry that comprises program counter 202 is configured to store within it an address of an instruction in a basic block to be retrieved and executed. During execution of the instructions of the basic block by the processor, program counter 202 updates the address stored within it so that it points to the next sequential instruction of the basic block to be executed. Instruction fetch unit 204 retrieves instructions of the basic block from memory at the address specified by the contents of program counter 202, and provides those instructions to instruction decode unit 206. Instruction decode unit 206 logically operates in accordance with the bits of the retrieved instruction to generate various control signals for operating other blocks of the simplified processor based at least in part on those bits. First CRC generator 208 includes the logic circuitry for receiving the address of the entry point into a basic block and using that address for initializing the CRC generator 208 before performing the CRC calculation. This address-based initialization is referred to herein as implicit initialization. First CRC generator 208 further includes the logic circuitry for receiving the retrieved instructions and calculating a first CRC based on the retrieved instructions. First CRC generator 208 further includes the logic circuitry for receiving information from instruction decode unit 206 and control-and-status register 216, and for using that received information to control its internal operations.

In one or more embodiments, first CRC generator 208 may be configured to determine or calculate the first CRC for retrieved instructions of a basic block according to the implicit initialization using a first polynomial. First CRC generator 208 further includes the logic circuitry for determining whether the calculated first CRC output value for the basic block matches a pre-computed reference value (i.e., the expected first CRC output value), and reporting that determination to the bad-match-exception-logic block 218. In one or more embodiments, the pre-computed reference value for a basic block is provided as an immediate value of an instruction included within the basic block. As discussed above, such instructions may be inserted into the basic blocks of a program by, for example, a compiler and/or another tool that further processes the output of the compiler. In one or more embodiments, execution of such an instruction results in its immediate value being compared with a CRC output value generated based on the instructions of the basic block. Responsive to a determination that the calculated first CRC output value for the basic block does not match the expected first CRC output value, bad-match-exception-logic block 218 raises an exception, which in turn causes the processor to transfer control to a corresponding exception handler. In this way, the detection of a corrupted instruction stream initiates at least one process to protect the system from the potentially damaging effects of the corrupted instruction stream.

Like first CRC generator 208, second CRC generator 210 includes the logic circuitry for receiving the address of the entry point into a basic block and using that address for initializing the second CRC generator 210 before performing the CRC calculation. Second CRC generator 210 further includes the logic circuitry for receiving the retrieved instruction and for calculating a second CRC based on the retrieved instruction. Second CRC generator 210 further includes the logic circuitry for receiving information from instruction decode unit 206 and control-and-status register 216, and using that received information to control its internal operations.

In one or more embodiments, second CRC generator 210 may be configured to determine or calculate the second CRC for retrieved instructions of a basic block according to the implicit initialization using a second polynomial. Second CRC generator 210 further includes the logic circuitry for determining whether the calculated second CRC for the basic block matches the pre-computed reference value (i.e., the expected second CRC output value), and reporting that determination to the bad-match-exception-logic block 218. Responsive to a determination that the calculated second CRC output for the basic block does not match the expected second CRC output value, bad-match-exception-logic block 218 raises an exception, which in turn causes the processor to transfer control to a corresponding exception handler. In this way, the detection of a corrupted instruction stream initiates a process to protect the system from the ill effects of the corrupted instruction stream.

In one or more embodiments, the pre-computed reference value for comparison with the second CRC output value generated based on the basic block is provided by an immediate value of an instruction included within the basic block.

Register file 212 provides registers for temporary storage of data. Execution unit 214 performs arithmetic and logical operations on data provided to it, and writes the results of those operations to register file 212.

In one or more embodiments, one way for first CRC generator 208 and second CRC generator 210 to generate their respective CRC output values is to compute them based on the instruction code of each basic block as generated by the compiler. In this case, architecture and implementation (i.e., ISA and microarchitecture) are cleanly separated and there is no need to expose implementation details of the processor to the compiler.

Alternatively, in one or more embodiments, a way for first CRC generator 208 and second CRC generator 210 to generate their respective CRC output values is, if compressed instructions (for example, as defined by the RISC-V ISA) are implemented in a processor by means of a 1:1 compressed instruction decoder in front of instruction decoder 206, then to generate the respective first and second CRC output values for compressed instructions based on their decompressed counterparts. The RISC-V compressed instruction specification (the 'C' extension) is such that a 1:1 mapping is possible. By generating the CRC output value based on decompressed instructions, the compressed instruction decoder may also be protected against fault attacks. It is noted that embodiments in accordance with this disclosure that use compressed instructions are not limited to the compressed instructions of the RISC-V ISA.

Yet another way to generate the CRC output values is based on the decoded instructions. A post-processing tool that generates the reference CRC values then needs knowledge about how instructions are decoded, which is dependent on the specific implementation of the processor. The security advantage is that fault attacks on the instruction decoder may be detected also. It is noted that in this approach, the CRC needs to be updated on wider data, i.e., including at least a portion of the digital output of instruction decode unit 206 which makes such an implementation more costly and potentially slower in operation.

Some inefficiencies and limitations exist with various approaches to implementing control-flow integrity mechanisms (including mechanisms that may detect instruction stream corruption). Various aspects of the inefficiencies and limitations of such mechanisms are described below prior to describing various improvements in accordance with one or more embodiments in accordance with this disclosure.

To generate a checksum, a CRC generator in accordance with this disclosure uses a known initial value, which may be set before the instructions in the basic block are executed. While executing the basic block, every instruction thereof is included into the checksum. For example, the checksum over basic block 102 in FIG. 1B, could be CRC-16 (init||li a0,0||li a1,3||li a3,5||c.cscheck 0), where || denotes the concatenation. In this example, the checksum is determined from assembly level instructions; however, it should be understood that the checksum may be determined based on the compiled application or machine encoding of the instructions and not based on the assembly language. The result of this CRC generation given the known initial value is a well-defined checksum for each basic block.

In one or more embodiments, the forward-edge CFI mechanisms of a processor may be enabled and disabled under program control. In embodiments that are configured to enable/disable the forward-edge CFI mechanisms, power savings may be obtained during the period of time during which these functions are disabled by having some or all of the circuitry that is used for these functions powered down, powered with a reduced voltage, or operated with a reduced frequency clock. In accordance with this disclosure, any suitable process and/or circuitry for saving power may be used when the forward-edge CFI mechanisms are disabled.

In one or more embodiments, whether the forward-edge CFI mechanisms are enabled or disabled depends on whether certain bits in a control-and-status register have been set or cleared. In one or more embodiments, the control-and-status register may read from and/or written to under program control. The specific bit positions within the control-and-status register that affect the operation of various aspects of the forward-edge CFI mechanisms may be chosen by a designer. Likewise, the value of any one of those bits, i.e., 0 or 1, that specifies the operation of various aspects of the forward-edge CFI mechanisms may be chosen by a designer.

For the re-initialization approach, a dedicated register may be included in the processor, and this dedicated register would be set, e.g., loaded, before each control flow transfer. The contents of this dedicated register represent an explicit initialization value to be used for the computation of the CRC based on the next basic block to be executed. In one or more embodiments, the explicit initialization value is provided as immediate data in an instruction. In one or more embodiments, the dedicated register referred to above may be part of the CRC generator logic circuitry. For example, first CRC generator 208 and second CRC generator 210 may each include a dedicated register as part of their logic circuitry and each of those dedicated registers may be loaded with an explicit initialization value. In one or more alternative embodiments, all the CRC generators in the processor used for CFI operations may share a common dedicated register.

Subsequently, once the target basic block is reached, the internal CRC generator state is initialized with the contents of the dedicated register before the first instruction is processed by the CRC generator. And, for the check, the CRC generator logic receives a reference value which can be compared to the internal state of the CRC generator, i.e., the CRC output value, at the end of a basic block. The comparison itself may be done automatically at each control flow transfer instruction. In one or more embodiments, the explicit initialization value and the reference value are provided, respectively, via instructions.

In order to offer options to the programmer for choosing a desired trade-off between code size and the level of security, various embodiments make use of both the 32-bit length of RISC-V fixed length instructions and the 16-bit length of RISC-V compressed instructions. It is noted that various embodiments in accordance with this disclosure may be implemented for processors other than those which implement the RISC-V instruction set architecture.

In the case of 32-bit instructions, 16-bit immediate values may be included in the instruction. This means that each basic block requires 64 additional bits of instructions without further optimization (i.e., two 32-bit instructions inserted into each basic block to implement control-flow integrity). One optimization is keeping a 16-bit CRC state, but only checking 11 bits. In this way, the smaller reference value can be included in a 16-bit compressed instruction rather than the larger 32-bit instruction to include the 16-bit immediate data used for the comparison, thereby saving 16 bits (i.e., 2 bytes) of instruction memory per basic block at the cost of lower security (i.e., 11-bit CRC rather than 16-bit CRC). That is, without the optimization, all 16 CRC bits would be checked, which, in turn, means that 16 reference bits would be provided via instruction for comparison with the 16 CRC bits. However, in order to provide the 16 reference bits for comparison, a 32-bit instruction would be used because the 32-bit instruction is large enough to provide a 16-bit immediate value.

In the correction approach, the initialization is done by providing a difference between the current state and the correct initialization value for the target basic block. The correction approach has the major advantage, that any error in the internal state before the transfer is forwarded to the state of the target basic block. Thus, the correction replaces the initialization, but the checking can be deferred. At some point, a check is needed, but in this arrangement there can be fewer checks. This saves instructions and thus decreases the code size overhead. On the other hand, the correction instructions always have to have the full width of the internal state and thus scaling the security is not possible. That is, if a 16-bit CRC is maintained, a correction value also has to have 16 bits (as opposed to smaller possible reference values as in the re-initialization approach). By correcting only 11 bits instead of 16 bits, it may be possible to find a correction value such that an 11-bit reference value could match later on, but there is mathematically no guarantee. Even worse, the more basic blocks have the same target basic block, the lower the probability for succeeding in finding correction values becomes. It is noted that the compilation step and correction value search are two independent steps, and therefore it may not be practical to keep on recompiling, if the search fails, with slightly different instructions.

Another shortcoming of the re-initialization approach is that fall-through cases do not allow for optimization, i.e., theoretically not all transfers need a correction. A "fall-through" refers to control passing from one basic block to the next sequential basic block without branching. Referring to the basic blocks shown in FIG. 1B, one could just generate the CRC from the beginning of the first basic block till the end of the last basic block. In the correction case, one would just need to provide a correction value in the middle block, in case the branch is taken. Together with the reference at the end of the last block, this accounts for two instructions. However, for re-initialization, a reference value is needed for checking the middle block and an explicit initialization value in case the branch is taken (both are needed as errors do not propagate once re-initialization has occurred). In addition, a reference value is needed for checking the last block, which accounts for as many instructions as with just the straight-forward three reference values for checking.

In view of the issues and disadvantages with the approaches described above, one or more embodiments in accordance with this disclosure provide alternatives to improve or optimize the trade-offs between code size and security.

One or more embodiments in accordance with this disclosure may provide implicit initialization. For example, rather than explicitly providing an initialization value, the address of the first instruction of the basic block may be used as the initialization value. Such implicit initialization is done without software intervention. It is noted that, although implicit initialization allows all initialization instructions to be eliminated (thus reducing total code size), implicit initialization also eliminates the option of choosing a custom initialization value as needed for transferring to a fall-through target via a branch.

One or more embodiments in accordance with this disclosure may provide a dedicated checksum, which allows the correction of only portions of the internal state (i.e., a substate), and to subsequently check only that substate, or portions thereof, against a reference value. Such an arrangement improves the trade-off between code size and scalability of security, while relying on the correction approach.

In accordance with this disclosure, the two approaches (i.e., correction and re-initialization) may be combined such that when transferring control from one function to another, the state is verified and a correct full-width internal state is restored. However, within a function, various short-cuts may be taken. For example, (i) correcting fewer bits than the full state; (ii) fall-through cases with few or no check bits; and (iii) checking fewer bits than are maintained/corrected, but potentially accumulating several small checks to increase security.

An aspect of one or more embodiments is a checksum function that is composed of several independently generated CRCs. For embodiments in which it is desired to achieve 16 bits of security, and for which corrections should be available on an 11-bit level, a CRC-5 may be used in combination with a CRC-11. In accordance with this disclosure, coprime CRC polynomials are used to ensure that security is not degraded. Regarding coprime polynomials, two polynomials are coprime if their greatest common divisor is one and if the two polynomials do not share a common factor.

In one or more embodiments a CRC-16 and a CRC-11 are maintained in order to scale between 16 and 11 bits of security. In general, any number of parallel checksums of any size is possible. However determining what the number of parallel checksums should be is a designer's choice based, at least in part, on whether maintaining those parallel checksums as a whole, or subsets thereof, makes sense from a code-size/security trade-off point of view.

It is noted that there may be more than one polynomial that can be used for generating a particular level of security. For example, one CRC-16 polynomial may be defined as $x^{16}+x^{15}+x^2+1$, and another CRC-16 may be defined as $x^{16}+x^{12}+x^2+1$. In one or more embodiments, the CRC-11 polynomial may be $x^{11}+x^{10}+x^9+x^5+x^3+1$. In one or more embodiments, the CRC-5 polynomial may be $x^5+x^4+x^2+1$.

As mentioned above, an initial value is used by the CRC generators. In one or more embodiments, the initial value may be provided by using the memory address of the first instruction of a basic block as the CRC initialization value rather than a CRC initialization value explicitly provided by the execution of an instruction that includes an immediate value. The term "implicit initialization" is used herein to distinguish between (1) explicitly providing a CRC initialization value in the immediate data field of an instruction; and (2) using the memory address of a first instruction of a basic block to be executed next. Since using the implicit initialization approach allows the CRC initialization value to be obtained from the program counter within the processor, there is no need to insert an extra instruction into each basic block in order to specify an explicit CRC initialization value. In this way the code-size overhead of CFI may be advantageously reduced. In one or more embodiments in accordance with this disclosure, implicit initialization occurs at transfer instructions, unless a check is deferred.

Table 1, below, shows various options for setting a reference value for a check.

| Providing 5 reference bits via a dedicated branch instruction | Providing 11 reference bits via a dedicated ref instruction | Providing 16 reference bits via a combination of the previous instructions | Providing 16 bits of reference value via a dedicated ref instruction |
|---|---|---|---|
| . . . | . . . | . . . | . . . |
| csbeq a0, a1, ref5, label10 | c.csref ref11 beq a0, a1, label12 | c.csref ref11 csbeq a0, a1, ref5, label10 | csref ref16 beq a0, a1, label12 |

Table 2, below, shows various options for correcting the state (possible in combination with a small check) for deferring the check.

| Correcting 11 bits of the state | Correcting 16 bits of the state | Correcting 11 bits of the state and providing 5 bits of reference value. | Correcting 16 bits of the state and providing 5 bits of reference value. |
|---|---|---|---|
| . . . | . . . | . . . | . . . |
| cscorr11 corrVal beq a0, a1, label12 | cscorr16 corrVal beq a0, a1, label12 | cscorr11 corrVal csbeq a0, a1, ref5, label10 | cscorr16 corrVal csbeq a0, a1, ref5, label10 |

In those cases where the check is not deferred, a CRC output value for each CRC generator in an embodiment may be checked against the reference bits that represent the expected CRC output value. In one or more embodiments, there are different instructions (of different size) for providing reference bits (see, for example, Table 1). These reference bits are concatenated and form a reference value which is used by the next checking instruction in the program being executed. The check is only done for the number of bits that have been provided. In one or more embodiments, if too few bits have been provided and the last instruction does not transfer to another function, then the check may be automatically deferred. But, if the transfer does go to another function and too few reference bits have been provided, then an exception is raised. Any suitable exception handling mechanism may be used with embodiments in accordance with this disclosure. Generally, the detection of an exception condition results in the transfer of control to an exception handler routine.

When checks are deferred, the CRC continues at the next basic block without re-initialization. As a result, CRC generation for a basic block may begin with an initialization value that is different from the address of its first instruction. If another basic block wants to branch to the same next basic block, a correction is needed. In general, if n basic blocks have the same basic block as successor, only n–1 of them need to perform a correction and one of the basic blocks can be executed without performing correction operations. If an optimization for code size is desired within a function, then the correction can provide less than 16 bits (i.e., partial substate correction), but should provide either 11 or 5 bits to keep at least one of the checksums fully correct. The next time a check is performed, only those bits of the internal state which have been corrected, and are therefore correct, are checked against the generated CRC. The remainder of the state can be ignored.

One potential consequence of the deferred checks mentioned above is that the system executing the program in which a series of deferred checks occurs is exposed to a greater risk of undetected fault attacks. The risk of undetected fault attacks, or any type of attack that compromises the integrity of the instruction stream or control flow, is greater because as the number of deferred checks increases, the amount of time between checks increases. The increased amount of time between checks results in a corresponding increase in the chance of an error occurring before it can be detected and mitigated. In another scenario, deferring a check and jumping or branching to a section of unprotected code may result in the indefinite deferral of the check. In other words, it may become too late to detect and correct a problem in the case of the instruction stream and control flow proceeding without being checked for too long a period of time. It will be appreciated that the amount of time that is "too long" depends on the attack surface to which the system may be exposed. Thus, in general, as the number of deferred checks increases, the likelihood of a fault attack going undetected and successfully corrupting the system executing a program also increases.

To reduce the risk of an undetected fault attack that occurs during a continuous series of deferred checks, one or more embodiments in accordance with this disclosure may implement a watchdog counter. In one or more embodiments the watchdog counter may be implemented as logic circuitry that includes a counter and associated logic for initializing the counter and detecting when a predetermined count is reached. The watchdog counter may ensure that trigger instructions, which initiate a comparison between the CRC value and a reference value, are executed within a predetermined number of deferred check instances. Alternative embodiments may provide a watchdog counter that tracks the amount of time that has elapsed between checks and raises an exception if the amount of time exceeds a predetermined amount of time.

Figure 3:
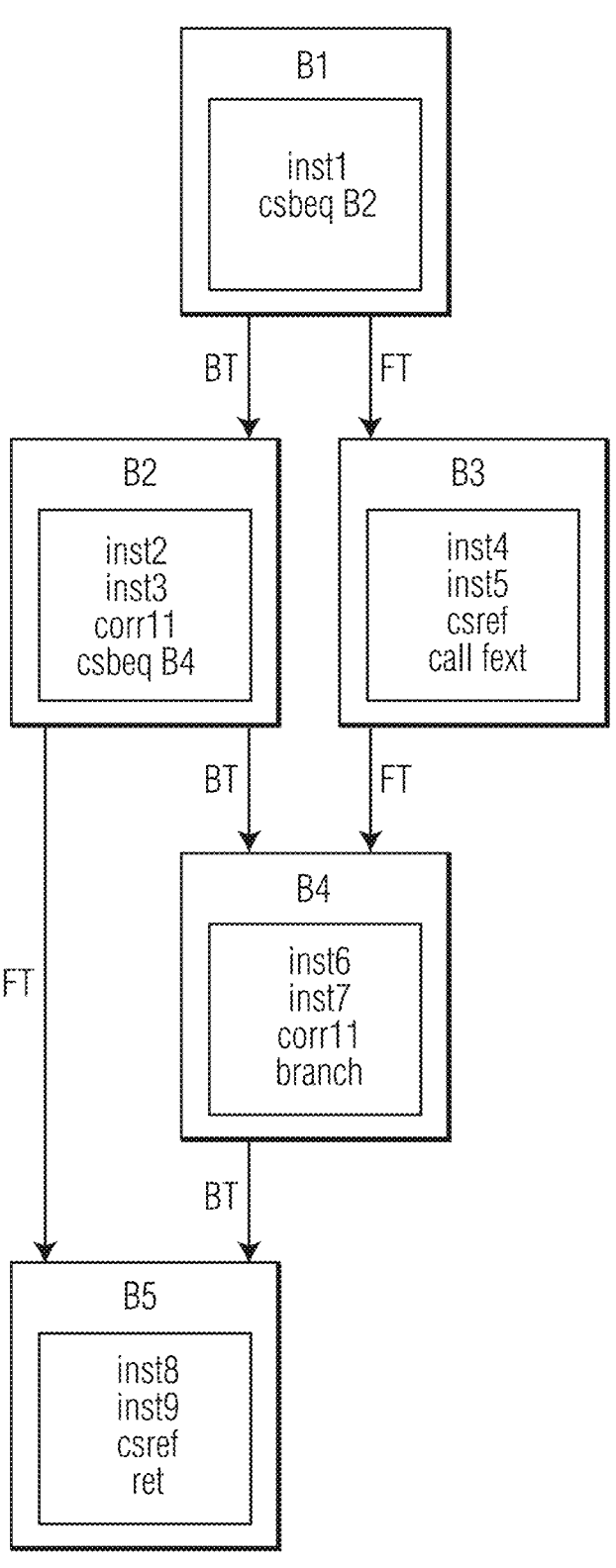
FIG. 3 is a control-flow graph that illustrates fall-through and branch-taken paths between various basic blocks.

FIG. 3 illustrates a control-flow graph of a sample program. Basic blocks B1, B2, B3, B4, and B5 are shown, together with the edges that show the possible fall-through and branch-taken paths for the sample program. Each of basic blocks B1-B5 includes at least one instruction from a base instruction set and at least one instruction from a custom extension of the instruction set. In this illustrative example, three custom instructions are used: csbeq, csref, and corr11. More particularly, basic block B1 includes csbeq, basic block B2 includes corr11 and csbeq, basic block B3 includes csref, basic block B4 includes corr11, and basic block B5 includes csref.

As shown in FIG. 3, basic blocks B1, B3 and B4 are basic blocks of sequential instructions. The same holds for B2 and B5. This is indicated by the FT (fall-through) labels on the edges, as opposed to the BT (branch taken) labels. B1 only branches to B2, however, B2 has no other predecessors, therefore, no correction is needed, however, for security reasons, a 5 bit check is done via csbeq. B3 does a call to a function, therefore a check is needed for which the reference bits are provided via csref. The check itself is done automatically when the call is performed. As B3 falls through to B4, B2 needs to correct the state when it branches to B4. Finally, in B5, reference bits are provided to check before the return.

FIG. 4 is a flow diagram of a method 400 of detecting a corrupted instruction stream in accordance with this disclosure. Method 400 includes executing 402, by a processor, a program, where the program includes a plurality of basic blocks, and each basic block has one or more instructions. In one or more embodiments the processor may be an embedded processor, but not every embodiment is limited to embedded processors. In one or more embodiments, the processors may implement the RISC-V ISA and a custom extension that includes instructions for performing various aspects of a forward-edge CFI mechanism. In one or more embodiments, the processor may implement a different instruction set including instructions for performing various aspects of a forward-edge CFI mechanism.

Method 400 further includes providing a first initializing value having a first number of bits and initializing 404 a first cyclic-redundancy-check (CRC) generator based, at least in part, on an address of a first instruction in a first basic block of the plurality of basic blocks, and initializing 406 a second CRC generator with the first number of bits based, at least in part, on the address of the first instruction in the first basic block of the plurality of basic blocks. Implicitly initializing refers to obtaining the address of the entry point instruction of a basic block and initializing a CRC generator with that address.

Method 400 continues by generating 408, by the first CRC generator, a first CRC output according to a first polynomial, and generating 410, by the second CRC generator, a second CRC output according to a second polynomial. One or more embodiments may include generating, by one or more additional CRC generators, a corresponding one or more additional CRC outputs. And, the one or more additional CRC generators may operate in parallel with the first CRC generator and the second CRC generator. In various embodiments, the one or more additional CRC generators are based on polynomials other than the first polynomial or the second polynomial. In one or more embodiments the various polynomials are coprime with respect to each other. Method 400 further includes checking 412 the first CRC output against a first reference value. Other embodiments may include checking the second CRC output against a second reference value. Likewise, other embodiments may check any combination of CRC generators against their corresponding reference values. In typical embodiments, these CRC generators are part of a processor and may be part of a single integrated circuit or may be part of a chiplet bonded to the other parts of the processor.

Method 400 further includes executing 414, if the first CRC output and the reference value do not match, an exception handler. That is, responsive to a mismatch between the first CRC output and the reference value (which indicates detection of a corrupted instruction stream), bad-match-exception-logic 218 raises an exception, which, in turn, initiates a transfer of control to a corresponding exception handler. In one or more embodiments, such an exception handler may, in addition to other actions, prevent further execution of the corrupted instruction stream, thereby helping to prevent adverse effects of executing a corrupting instruction stream.

Figure 5:
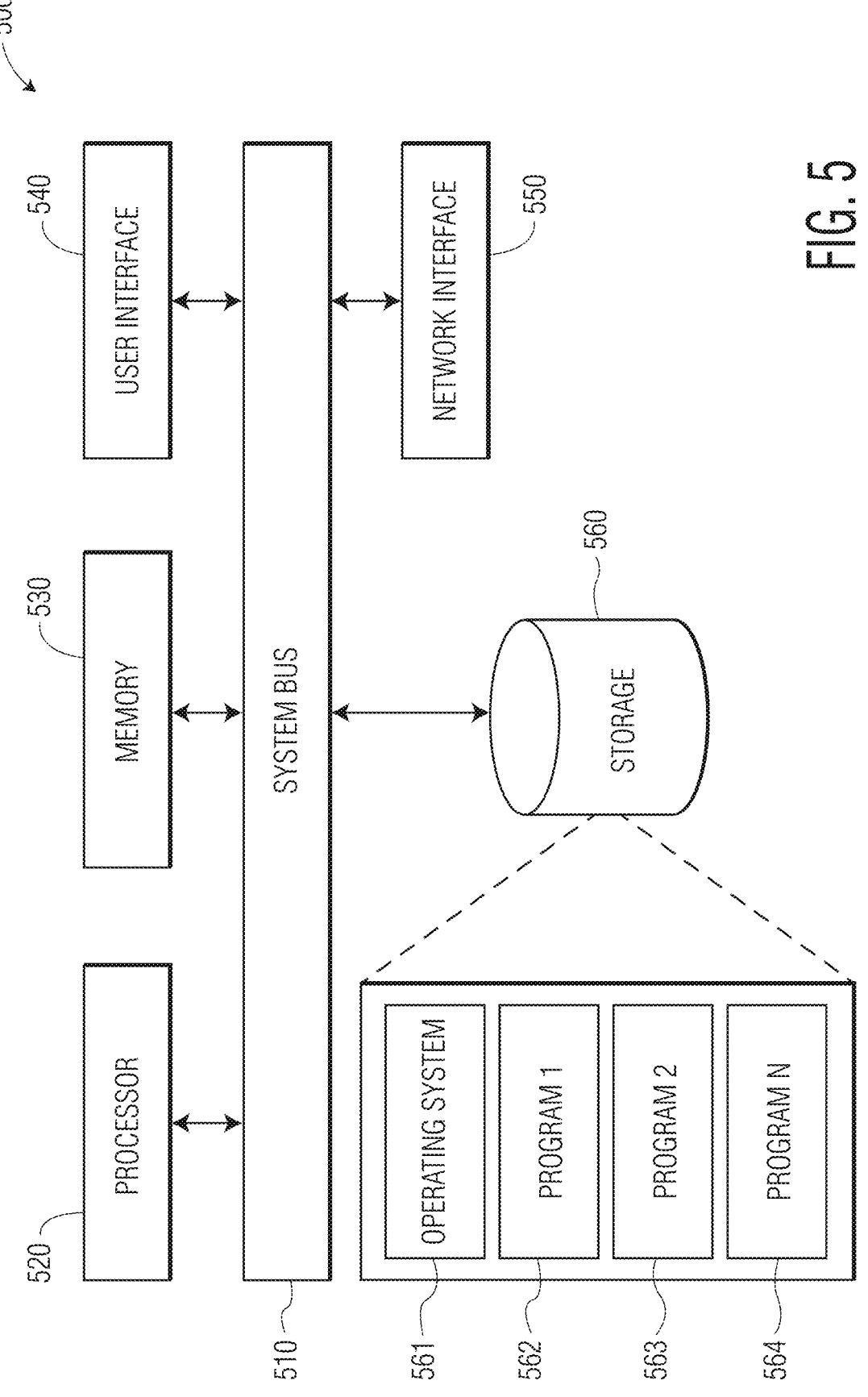
FIG. 5 is a high-level block diagram of an embedded system in accordance with this disclosure.

FIG. 5 is a high-level block diagram of an illustrative system 500 in accordance with this disclosure. As shown, system 500 includes a processor 520, a memory 530, a user interface 540, a network interface 550, and a storage subsystem 560 communicatively coupled via one or more system buses 510. It will be understood that FIG. 5 constitutes, in some respects, an abstraction and that the actual organization of the components of illustrative system 500 may be more or less complex than illustrated.

Processor 520 may be any hardware device capable of executing instructions stored in memory 530 or storage subsystem 560, or otherwise processing data, and which also includes the logic circuitry for implementing the forward-edge CFI mechanisms described herein. As such, processor 520 may include a microprocessor, microcontroller, embedded processor, graphics processing unit (GPU), digital signal processor (DSP), vector processor, neural network processor, artificial intelligence accelerator, deep learning processor, field programmable gate array (FPGA), application-specific integrated circuit (ASIC), or other similar devices or combination of devices.

Memory 530 may include various memories such as, for example L1, L2, or L3 cache or system memory. As such, memory 530 may include static random-access memory (SRAM), dynamic RAM (DRAM), non-volatile memory (e.g., a hard disc drive, a solid-state drive, a flash memory device, other storage devices, or any combination thereof), read only memory (ROM), or other similar memory devices, or various combinations of some or all of the foregoing memory types.

User interface 540 may include one or more devices for enabling communication with a user. For example, user interface 540 may include a display, a touch interface, a voice interface, a mouse, and/or a keyboard for receiving user commands. In one or more embodiments, a command line interface or graphical user interface may be presented on the display or touch interface of user interface 540 or may be provided to a remote terminal (not shown) via network interface 550.

Network interface 550 may include one or more devices for enabling communication with other hardware devices. For example, network interface 550 may include a network interface card (NIC) configured to communicate according to the Ethernet protocol or other communications protocols, including wireless protocols. Additionally, network interface 550 may implement a TCP/IP stack for communication according to the TCP/IP protocols. Various alternative or additional hardware or configurations for network interface 550 will be apparent. In one or more embodiments, network interface 550 may be configured to communicatively couple system 500 to a communications network, such as the Internet.

Storage subsystem 560 may include one or more machine-readable storage devices such as read-only memory (ROM), random-access memory (RAM), magnetic disk storage device, optical storage device, flash-memory devices, or similar storage devices. In various embodiments, storage subsystem 560 may store instructions for execution by processor 520 or data upon which processor 520 may operate. For example, storage subsystem 560 may store an operating system 561 for controlling various basic operations of illustrative system 500. Storage subsystem 560 may include a first program 562 that when executed implements its intended function. Storage subsystem 560 may further include a second program 563 that when executed implements its intended function. Likewise, storage subsystem 560 may further include an Nth program 564 that when executed implements its intended function. Each of the programs 562, 563, and 564 may include processor-executable instructions that may be divided into basic blocks and that may be processed, as described above, to determine CRC values corresponding to the basic blocks.

Memory 530 and storage subsystem 560 may both be considered to be "non-transitory machine-readable media." As used herein, the term "non-transitory" will be understood to exclude transitory signals but to include all forms of storage, including both volatile and non-volatile memories.

System bus 510 allows communication between processor 520, memory 530, user interface 540, storage subsystem 560, and network interface 550.

The foregoing disclosure provides illustration and description, but is not intended to be exhaustive or to limit the aspects to the precise form disclosed. Modifications and variations may be made in view of the above disclosure or may be acquired from practice of the aspects.

Unless stated otherwise, terms such as "first" and "second" are used to arbitrarily distinguish between the elements such terms describe. Thus, these terms are not necessarily intended to indicate temporal or other prioritization of such elements.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (e.g., rotated 90 degrees or at other orientations) and the spatially relative descriptors used herein may likewise be interpreted accordingly.

As used herein, the term "vertical/vertically" means nominally orthogonal to the surface of the object being referenced.

As used herein, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances.

As used herein, the term "about" indicates the value of a given quantity may vary from its nominal value based on, for example, various manufacturing tolerances. By way of example, and not limitation, the term "about" may indicate the cited value of a given quantity may vary within, for example, 1-30% of the value (e.g., ±0.5%, ±1%, ±5%, ±10%, ±20%, or ±30% of the value). Specific ranges are provided herein when needed.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

The foregoing disclosure provides illustration and description, but is not intended to be exhaustive or to limit the aspects to the precise form disclosed. Modifications and variations may be made in light of the above disclosure or may be acquired from practice of the aspects.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the subjacent claims.

What is claimed is:

1. A method of detecting a corrupted instruction stream, comprising:

executing, by a processor, a program, the program including a plurality of basic blocks, wherein each basic block has one or more instructions to be executed by the processor without branching;

retrieving, by an instruction fetch unit of the processor, a first basic block of the program from a memory address associated with a memory device;

initializing a first cyclic-redundancy-check (CRC) generator within the processor based, at least in part, on a first portion of the memory address of a first instruction in the first basic block of the plurality of basic blocks;

initializing a second CRC generator within the processor based, at least in part, on a second portion of the memory address of the first instruction;

generating, by the first CRC generator, a first CRC output based on the first basic block according to a first polynomial;

generating, by the second CRC generator, a second CRC output based on the first basic block according to a second polynomial;

executing the first basic block; and when an end of the first basic block is reached without encountering an instruction to transfer control from a first function of the first basic block to a second function, selectively deferring a CRC check operation; and generating, by the first CRC generator, a third CRC output based on a next basic block of the program according to the first polynomial without reinitializing the first CRC generator; and generating, by the second CRC generator, a fourth CRC output based on the next basic according to the second polynomial without reinitializing the second CRC generator; and wherein a first order of the first polynomial and a first order of the second polynomial are selected to provide a selected security level.

2. The method of claim 1, wherein the first polynomial and the second polynomial are co-prime.

3. The method of claim 1, wherein:
the selected security level is sixteen bits;
the first order of the first polynomial is eleven; and
the second order of the second polynomial is five.

4. The method of claim 3, wherein:
the first CRC generator is a CRC-11 generator; and
the second CRC generator is a CRC-5 generator.

5. The method of claim 1, further comprising:
determining a second basic block includes a branch function to the next basic block;
performing the CRC check operation based on the second basic block; and
optionally performing a CRC correction operation when the CRC check operation determines a bit error.

6. The method of claim 1, wherein, when a number n of basic blocks branch to a common basic block, the method comprises:
performing the CRC check operation for one less than the number (n−1) of the basic blocks that branch to the common basic block; and
optionally performing a CRC correction operation for bits of one of the number n of the basic blocks when the CRC check operation for the one determines a bit error.

7. The method of claim 1, wherein selectively deferring the CRC check operation comprises:
concatenating reference bits from instructions of the first basic block to form a reference value;
determining a number of the reference bits; and
deferring the CRC check operation when the number of reference bits is less than a number of bits of either the first CRC generator or the second CRC generator.

8. The method of claim 1, further comprising:
concatenating reference bits from instructions of the first basic block to form a reference value;
determining a number of the reference bits; and selectively performing a partial correction based on one of the first CRC value or the second CRC value to produce corrected bits when the number of reference bits is equal to or greater than a number of bits of the second CRC generator and less than a number of bits of the first CRC generator.

9. The method of claim 8, wherein, subsequently, when the CRC check operation is performed, the method further comprising:
performing the CRC check operation on the corrected bits; and
ignoring a state of the uncorrected bits.

10. The method of claim 1, further comprising:
concatenating reference bits from instructions of the first basic block to form a reference value;
determining a number of the reference bits;
performing the CRC check operation based on both the first CRC value and the second CRC value when the number of the reference bits is equal to a sum of a first number of bits of the first CRC generator and a second number of bits of the second CRC generator; and
reinitializing the first CRC generator and the second CRC generator using a first memory address of a first instruction of the next basic block.

11. The method of claim 1, wherein implicitly initializing the first CRC generator occurs at a beginning of execution of the first basic block.

12. A method of using code signatures to verify flow control integrity, the method comprising:
executing, by a processor, a program, the program including a plurality of basic blocks, wherein each basic block has one or more instructions to be executed by the processor without branching;
retrieving, by an instruction fetch unit of the processor, a first basic block of the program from a memory address associated with a memory device;
implicitly initializing a first cyclic-redundancy-check (CRC) generator and a second CRC generator within the processor based on one or more portions of the memory address of a first instruction in the first basic block of the plurality of basic blocks;
generating, by the first CRC generator, a first CRC output according to a first polynomial and, by the second CRC generator, a second CRC output according to a second polynomial based on the first basic block;
executing the first basic block;
concatenating reference bits determined from instructions of the first basic block to determine reference bits; and
when an end of the first basic block is reached without encountering an instruction to transfer control from a first function of the first basic block to a second function, determining a number of reference bits; and
selectively deferring a CRC check operation based on the number of reference bits; and
wherein a first order of the first polynomial and a first order of the second polynomial are selected to provide a selected security level.

13. The method of claim 12, wherein selectively deferring the CRC check operation comprises deferring the CRC check operation when the number of reference bits is less than a number of bits of either the first CRC generator or the second CRC generator.

14. The method of claim 12, further comprising selectively performing a partial correction based on one of the first CRC value or the second CRC value to produce corrected bits when the number of reference bits is equal to or greater than a number of bits of the second CRC generator and less than a number of bits of the first CRC generator.

15. The method of claim 14, wherein, subsequently, when the CRC check operation is performed, the method further comprising:

performing the CRC check operation on the corrected bits; and ignoring a state of the uncorrected bits.

16. The method of claim 12, further comprising:

performing the CRC check operation based on both the first CRC value and the second CRC value when the number of the reference bits is equal to a sum of a first number of bits of the first CRC generator and a second number of bits of the second CRC generator; and reinitializing the first CRC generator and the second CRC generator using a memory address of a first instruction of the next basic block.

17. The method of claim 12, wherein:

a first order of the first polynomial and a second order of the second polynomial are selected to provide a selected security level;

the selected security level is sixteen bits;

the first CRC generator generates an eleven-bit checksum; and the second CRC generator generates a five-bit checksum.

18. A processor comprising:

a program counter;

an instruction fetch unit configured to provide instructions that comprise a program including a plurality of basic blocks, each basic block including a sequence of instructions to be executed without branching;

an instruction decode unit coupled to the instruction fetch unit, the instruction decode unit configured to receive a first basic block of the plurality of basic blocks, and to generate a plurality of control signals;

a first cyclic-redundancy-check (CRC) generator coupled to the program counter to receive an address, coupled to the instruction fetch unit to receive the bits of the instructions, and coupled to the instruction decode unit to receive at least a portion of the plurality of control signals, the first CRC generator configured to generate a first CRC output in accordance with a first polynomial based on the instructions of the first basic block;

a second CRC generator coupled to the program counter to receive the address, coupled to the instruction fetch unit to receive at least a second portion of the bits of the instructions, and coupled to the instruction decode unit to receive at least a portion of the plurality of control signals, the second CRC generator configured to generate a second CRC output in accordance with a second polynomial based on the instructions of first basic block;

a register to store the first CRC output and the second CRC output and to concatenate and store reference bits determined from each of the instructions to form a reference value; and CRC control circuitry configured to determine a number of reference bits of and to selectively defer a CRC checking operation based, at least in part, on the number of reference bits;

wherein the instruction fetch unit and the instruction decode unit are implemented in circuitry; and wherein a first order of the first polynomial and a first order of the second polynomial are selected to provide a selected security level.

19. The processor of claim 18, wherein the CRC control circuitry selectively defers the CRC check operation when, at the end of execution of the first basic block, the instructions do not branch to another function and when the number of reference bits is less than a number of bits of either the first CRC generator or the second CRC generator.

* * * * *